United States Patent
Mika et al.

(10) Patent No.: US 7,065,479 B2
(45) Date of Patent: Jun. 20, 2006

(54) METHOD FOR DETERMINING AND COMPENSATING FOR PEENING-INDUCED DISTORTION

(75) Inventors: David Peter Mika, Clifton Park, NY (US); Apostolos Pavlos Karafillis, Arlington, MA (US); Dale Robert Lombardo, Cincinnati, OH (US); Steven Robert Hayashi, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 844 days.

(21) Appl. No.: 10/156,490

(22) Filed: May 28, 2002

(65) Prior Publication Data

US 2003/0225476 A1 Dec. 4, 2003

(51) Int. Cl.
*G06G 7/48* (2006.01)

(52) U.S. Cl. .............................................. 703/7; 72/53

(58) Field of Classification Search ............... 703/7; 72/53; 148/508, 510; 345/419
See application file for complete search history.

(56) References Cited

U.S. PATENT DOCUMENTS

| | | | |
|---|---|---|---|
| 4,567,774 A | 2/1986 | Manahan et al. | |
| 4,683,014 A * | 7/1987 | Porowski et al. | ............ 72/30.1 |
| 5,003,805 A | 4/1991 | Thompson | |
| 5,072,606 A | 12/1991 | Koehler et al. | |
| 5,166,885 A | 11/1992 | Thompson | |
| 5,172,580 A | 12/1992 | Thompson | |
| 5,204,826 A | 4/1993 | Thompson et al. | |
| 6,311,135 B1 | 10/2001 | Suresh et al. | |
| 6,476,804 B1 * | 11/2002 | Costabel | ................... 345/419 |
| 6,593,729 B1 * | 7/2003 | Sundin | ................. 324/207.16 |
| 6,714,901 B1 * | 3/2004 | Cotin et al. | ................... 703/7 |

OTHER PUBLICATIONS

A. Levers and A. Prior, "Finite Element Analysis of Shot Peening", Journal of Materials Processing Technology, 80-81 (1998) pp. 304-308.

L.V. Grasty and C. Andrew, "Shot peen forming sheet metal: finite element prediction of deformed shape", (Proc Instn Mech Engrs vol. 210), pp. 361-366 (1996).

* cited by examiner

*Primary Examiner*—Albert W. Paladini
(74) *Attorney, Agent, or Firm*—Penny A. Clarke; Patrick K. Patnode

(57) ABSTRACT

A method for determining an equilibrium configuration for an object to be subjected to peening includes representing a bulk geometry of the object as a solid body and representing a surface of the object as a surface layer overlying the solid body. The method further includes expanding the surface layer in response to a number of thermal loads to simulate peening and balancing a number of forces on the surface layer and the solid body to determine the equilibrium configuration of the object after peening.

28 Claims, 7 Drawing Sheets

METHOD FOR DETERMINING AND COMPENSATING FOR PEENING-INDUCED DISTORTION

BACKGROUND OF THE INVENTION

The invention relates generally to a method for predicting and compensating for shot peen distortion, and more particularly, to a method for predicting and compensating for shot peen distortion for objects having generalized geometries.

Shot peening is an industrial surface treatment routinely applied to reduce fatigue and consists of bombarding many small spherical hard particles onto a component surface, resulting in localized plastic deformation and residual compressive stresses. The resulting compressive surface stresses enhance fatigue and corrosion resistance but in some cases also introduce undesirable part distortion, which must be adequately compensated. Distortions are most problematic for components with thin-walled geometries that are subjected to high peening intensities, where the tolerance bands for the components are narrow.

A current method for compensating for part distortion involved peening the component twice. Briefly, a part is peened before a final machining, and then a light peen is performed on the newly machined surfaces. While this method can be used to produce satisfactory components, it undesirably requires additional manufacturing operations, thereby increasing costs and throughput times. Accordingly, it would be desirable to develop a method that compensates for shot peen distortion but does not require additional manufacturing operations.

Previous attempts have been made to model the effects of shot peening. However, the methods developed were tailored to solve sheet-metal forming problems, such as the contouring of aircraft wing-skins, and utilized only shell elements, or alternatively utilized only solid elements. Accordingly, neither of these models is adequate for the more general geometries of typical aircraft engine components, such as airfoils, rotating parts with thin flanges, thin-walled conical rotating sections, parts with true bolt locations that are applied after peening, and parts with seal teeth, or rabbit diameters that are applied after peening.

Accordingly, it would be desirable to develop a method that predicts and compensates for peening-induced distortion of objects with generalized geometries.

BRIEF DESCRIPTION OF THE INVENTION

Briefly, in accordance with one embodiment of the present invention, a method is provided for determining an equilibrium configuration for an object to be subjected to peening. The method includes representing a bulk geometry of the object as a solid body and representing a surface of the object as a surface layer overlying the solid body. The method further includes expanding the surface layer in response to a number of thermal loads to simulate peening and balancing a number of forces on the surface layer and the solid body to determine the equilibrium configuration of the object after peening.

A compensation method embodiment is provided for compensating for peening-induced distortion of an object to be subjected to peening. The compensation method includes representing a bulk geometry of the object as a solid body and representing a surface of the object as a surface layer overlying the solid body. The compensation method further includes specifying a number of patches on the surface layer, expanding a portion of the surface layer within each patch in response to a respective one of a number of thermal loads to simulate peening, and balancing a number of forces on the surface layer and the solid body to determine an equilibrium configuration of the object after peening. The compensation method further includes adjusting at least one dimension of the object based on the equilibrium configuration determined by the balancing step.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
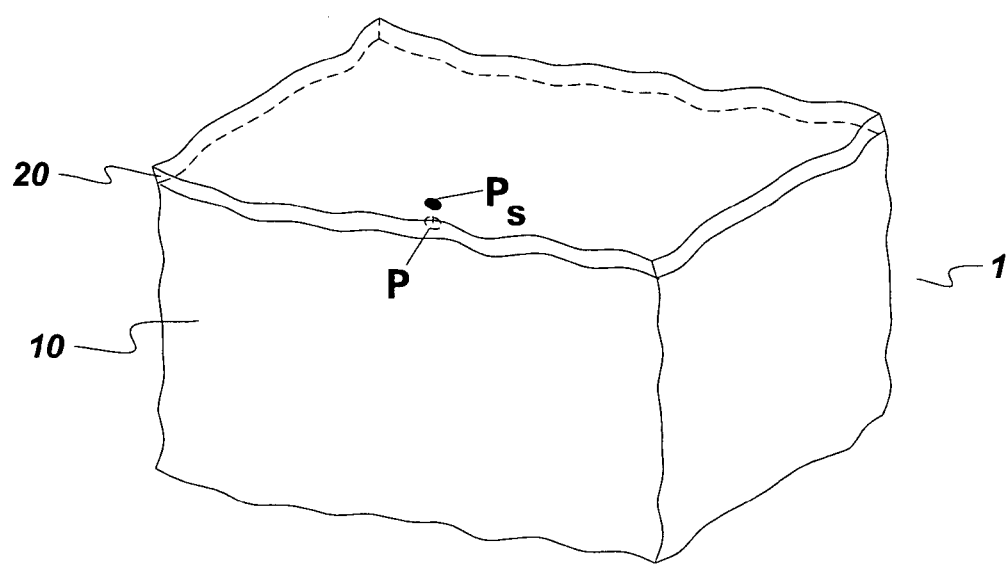
FIG. 1 illustrates an exemplary object represented as a surface layer overlying a bulk geometry.
Figure 6:
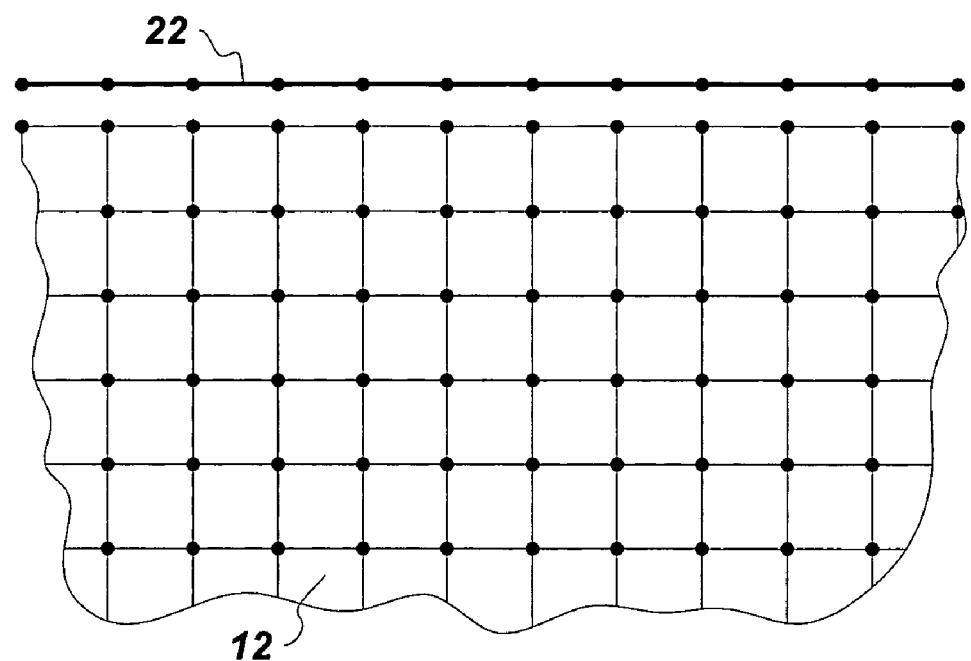
FIG. 6 shows exemplary solid and surface elements.

A method embodiment for determining an equilibrium configuration for an object 1 to be subjected to peening is described with reference to FIGS. 1 and 6. The method includes representing a bulk geometry 10 of object 1 as a solid body (also indicated by reference numeral 10) and representing a surface of object 1 as a surface layer 20 overlying solid body 10. FIG. 1 illustrates solid body 10 and surface layer 20 for an arbitrary object 1. In order to predict the response of object 1 to peening, a thermal expansion pseudo-peening formulation is employed. Namely, surface layer 20 is expanded in response to thermal loads $\Delta T$ to simulate peening. The method further includes balancing a number of forces on surface layer 20 and solid body 10 to determine the equilibrium configuration of object 1 after peening.

Beneficially, by representing the peened surface of object 1 as surface layer 20 and by expanding surface layer 20 in response to thermal loads $\Delta T$ to simulate the effect of peening, commercial finite element packages can be used to apply the thermal loads $\Delta T$ and solve for the equilibrium configuration.

According to a particular embodiment, surface layer 20 comprises a number of surface elements 22, and solid body 10 comprises a number of solid elements 12. As used herein, the term surface element 22 refers to elements that are specialized to represent thin surfaces and encompasses both membrane and shell elements, as those terms are generally used in finite element analysis. Solid and surface elements 12, 22 are schematically depicted in FIG. 6. For this embodiment, each of the surface elements 22 is expanded in response to a respective one of the thermal loads, and the forces on the surface elements 22 and the solid elements 12 are balanced to determine the equilibrium configuration of object 1 after peening.

According to one aspect, surface layer 20 and surface elements 22 maintain forces primarily in the plane of the peened surface. According to another aspect, the forces on object 1 include a number of compressive surface stresses imparted by the thermal loads ΔT and which cause surface elements 22 to expand in proportion to the respective thermal load ΔT and an expansion coefficient. According to a particular embodiment, the expansion coefficient comprises an expansion coefficient matrix ã. The representation of surface layer 20 can be selected such that the components of the expansion coefficient matrix ã can be set independently and in such a way as to conserve volume, to more closely model the typical response of metals undergoing plastic deformation:

$$\tilde{\alpha} = \begin{bmatrix} \frac{1}{2}\alpha & 0 & 0 \\ 0 & \frac{1}{2}\alpha & 0 \\ 0 & 0 & -\alpha \end{bmatrix}$$

According to another aspect, solid body 10 is characterized by a stiffness, which depends on well-known or measurable material properties of the object, such as Young's modulus of elasticity, Poisson's ratio, and the sheer modulus, among others. By representing bulk geometry 10 as solid body 10 and the surface of object 1 as surface layer 20, the response of the peened object 1 to other boundary conditions or loads (such as due to prior residual stresses, centrifugal forces etc.) is advantageously decoupled from the peening response and modeled by familiar means, such as finite element analysis. Exemplary software packages for performing finite element analysis include ANSYS and ABAQUS. For another aspect, a displacement field across an interface 11 between surface layer 20 and the solid body 10 has a continuity constraint, which limits the displacement of a point $P_s$ on surface layer 20 relative to a corresponding point P on an outer surface of solid body 10, thereby providing the desired continuity between surface layer 20 and solid body 10. Exemplary points $P_s$ and P are illustrated in FIG. 1.

This decoupling approach, namely decoupling the stiffness response of the peened object of the bulk geometry 10 from the peening response of the peened surface 20, is based on the following factors. The impact of hard, spherical balls on a surface is highly localized. Large plastic strains develop locally and diminish rapidly from each impact site. Assuming the surface is sufficiently wide, the residual stresses and plastic strain caused by numerous impacts are only a function of depth, with the residual stress tensor having the following form:

$$\tilde{R}(z) = \begin{bmatrix} R & 0 & 0 \\ 0 & R & 0 \\ 0 & 0 & 0 \end{bmatrix}$$

where the z-axis coincides with the surface normal. In particular, although plastic strains typically reach between ten to fifty percent (10–50%) at the surface, significant plastic strain is not usually found at depths greater than 0.5 mm., and thus the effect is very much a surface phenomenon. Accordingly, shot peen distortion of an object 1 can be accurately predicted by decoupling the response of the bulk geometry 10 from the peening response of the peened surface layer 20.

The method can also be used to account for a number of pre-existing residual stresses in object 1. For instance, prior forging, cooling, or machining processes can cause exemplary bulk material residual stresses. For a particular embodiment, the residual stresses are superimposed on bulk geometry 10 within a finite element model. This superposition approximation is applicable because bulk material residual stresses are usually small in magnitude relative to the stresses near the object surface that are induced by peening.

Figure 2:
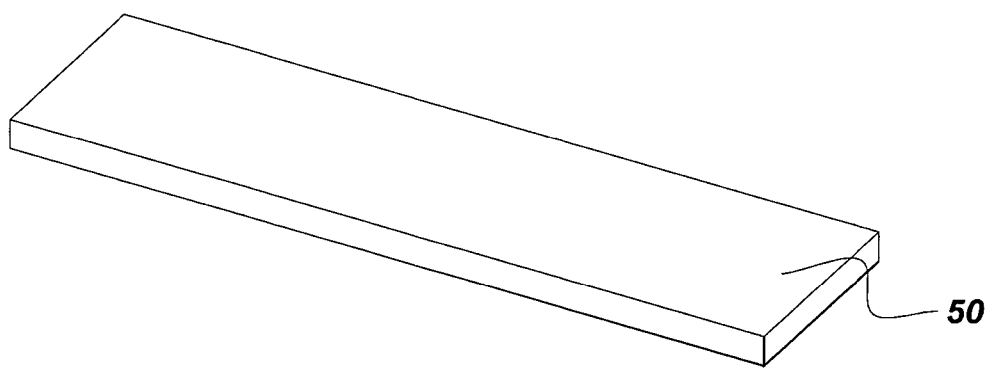
FIG. 2 illustrates an exemplary test coupon.
Figure 4:
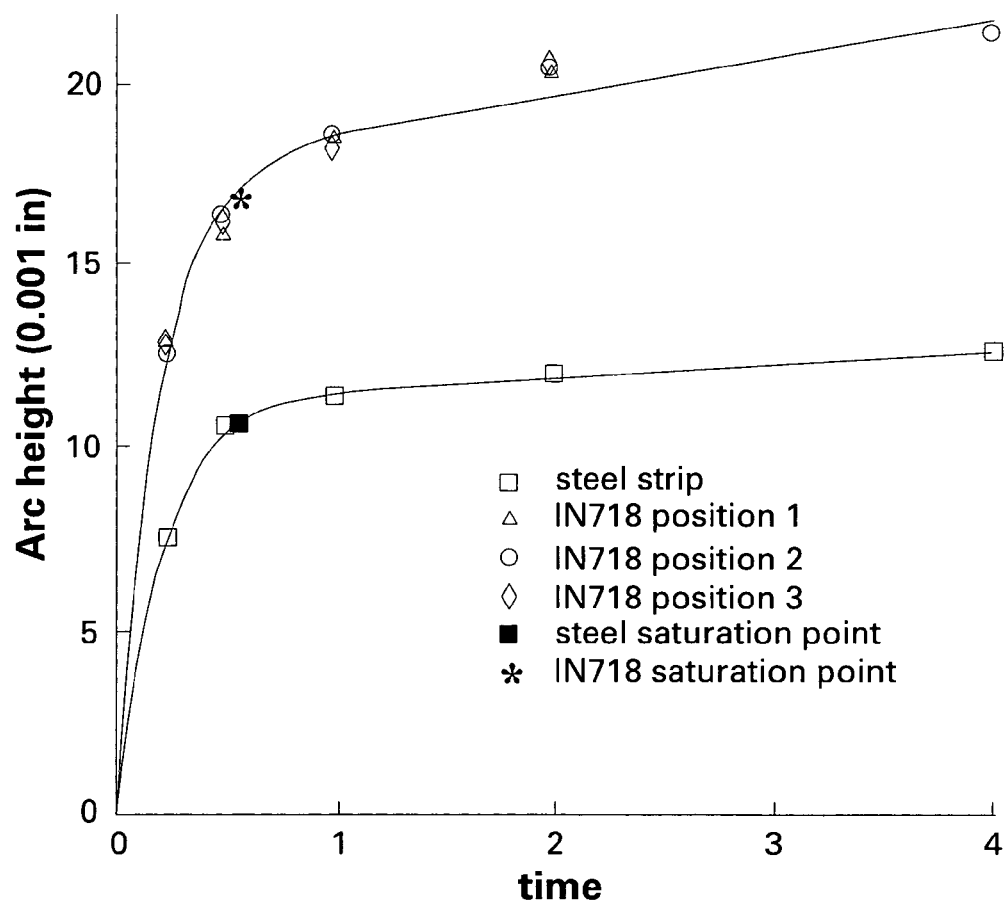
FIG. 4 shows exemplary peening response curves for Inconel 718 and steel coupons that were tested side-by side.

Test coupons 50 provide a simple means for determining and modeling the effects of peening. An exemplary test coupon 50 is illustrated in FIG. 2. It is a well-known and accepted industrial practice to subject steel test coupons 50 to shot spray to characterize and quantify the peening treatment. The deflection (or arc height) of test coupon 50 quantifies the coupon curvature caused by peening. More particularly, coupon arc height is a function of many factors including the coverage (or time under shot spray), the intensity I of the spray, which itself is a function of many machine parameters, and the shot properties. To make peening processes reliable and repeatable, it is general industry practice to reduce these many factors to a peen intensity I and a peen coverage (or peen time, normalized by the coverage), in characterizing the peening process. Peen intensity I is a calculated quantity determined from tests of several standard steel coupons 50, each subjected to increasing exposure times under a constant peen spray environment. Peen intensity I is the coupon arc height corresponding to a peen time, which, when doubled, would yield a (typical) ten percent (10%) rise in the coupon arc height. Peen intensity values $I^s$ are measured and reported for a number of industry standard steel coupons 50 including the A-type and N-type, which differ in thickness only. Here, the superscript s indicates that the intensity is defined for steel coupons 50 to distinguish the response from that of coupons 50 composed of other materials, which will yield a different intensity measure due to their different properties. Exemplary peening response curves for Inconel 718 and steel coupons 50 that were tested side-by-side are shown in FIG. 4. The calculated intensity values are identified.

Modeling Coupon Response

Because of their simple geometry and wide industrial usage, test coupons 50 provide useful vehicles for determining the psuedo-peening model, for applications to objects 1 with general geometries. Accordingly, for a particular embodiment, the method further includes modeling a response $h_m^t$ of a test coupon 50 to peening as a function of a surface layer thickness 40 and thermal load ΔT to obtain a coupon arc height function $f_2^t$, which has a functional form:

$$h_m^t = f_2^t(\text{surface layer thickness}, \Delta T),$$

where superscript t refers to 'target material' and subscript m refers to 'model response,' as compared to an experimentally determined coupon height response to shot spray peening. The deflection (or arc height) $h_m^t$ of test coupon 50 varies with the coupon curvature caused by peening, and coupon arc height function $f_2^t$ quantifies the arc height response of test coupon 50 to the chosen pseudo-peening parameters, namely surface layer thickness 40 and thermal load $\Delta T$.

In order to model generalized geometries under peening conditions, coupon arc height function $f_2^t$ is interpolated to obtain a thermal function $F_2^t$. In this manner, thermal load $\Delta T^t$ for the test material is expressed as a function of surface layer thickness 40 and coupon arc height $h_m^t$. The thermal function $F_2^t$ has a functional form:

$$\Delta T^t = F_2^t(\text{surface layer thickness, } h_m^t).$$

Figure 3:
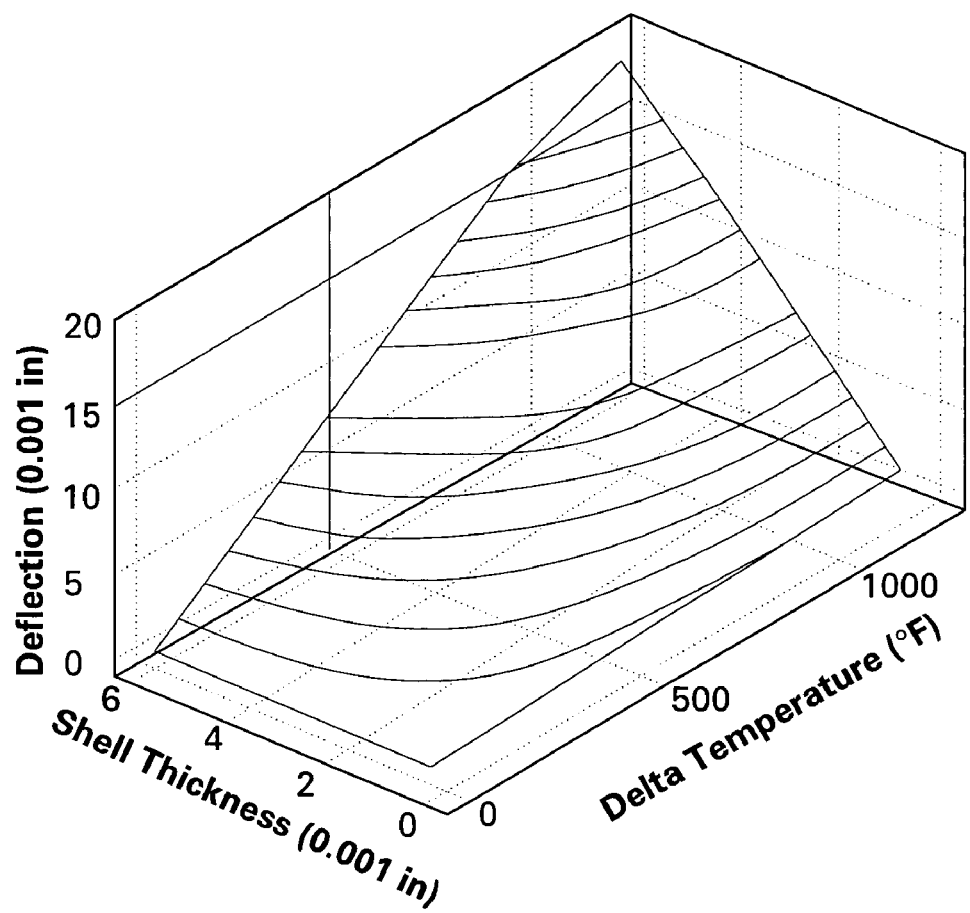
FIG. 3 illustrates, in graphic form, an exemplary peening arc height function for an A-type test coupon.

According to a more particular embodiment, coupon arc height function $f_2^t$ is determined using finite element analysis. For example, the response of test coupon 50 to peening is modeled using finite element software, such as commercially available software, one example of which is ANSYS. The exemplary coupon arc height functions $f_2^t$ plotted in FIG. 3 were obtained using ANSYS, repeatedly varying the thermal load $\Delta T$ and surface layer thickness 40 for a test coupon 50.

Still more particularly, the response of test coupon 50 to peening is modeled as follows. Test coupon 50 is represented as a number of discrete solid elements 51, and a peen surface of the test coupon is represented by the surface layer, which is simulated as a number of membrane or shell-type elements 52 (both referred to as "surface elements" 52 herein) overlying solid elements 51. A number of surface layer thickness 53 and thermal load $\Delta T$ values are selected, and effects of this pseudo-peened test coupon 50 are determined for the different values. Namely, for each surface layer thickness 53 and thermal load $\Delta T$, surface elements 52 are expanded in proportion to thermal load $\Delta T$, and a number of forces on the surface and solid elements 52, 51 are balanced, to obtain an equilibrium arc height for test coupon 50. Exemplary arc height data are generated using commercially available finite element software, such as ANSYS. Coupon arc height function $f_2^t$ is obtained by fitting the arc height data.

Shot Peening of Test Coupons

Figure 5A:
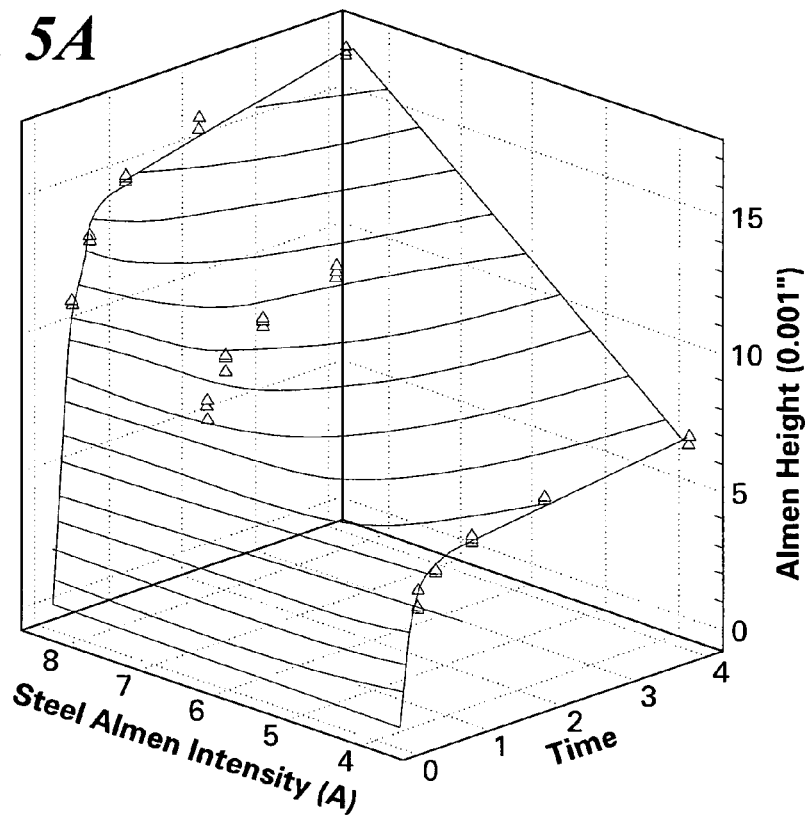
FIGS. 5a and 5b show exemplary coupon arc height data for steel and Inconel 718 test coupons, plotted as a function of peen time and peen intensity.
Figure 5B:
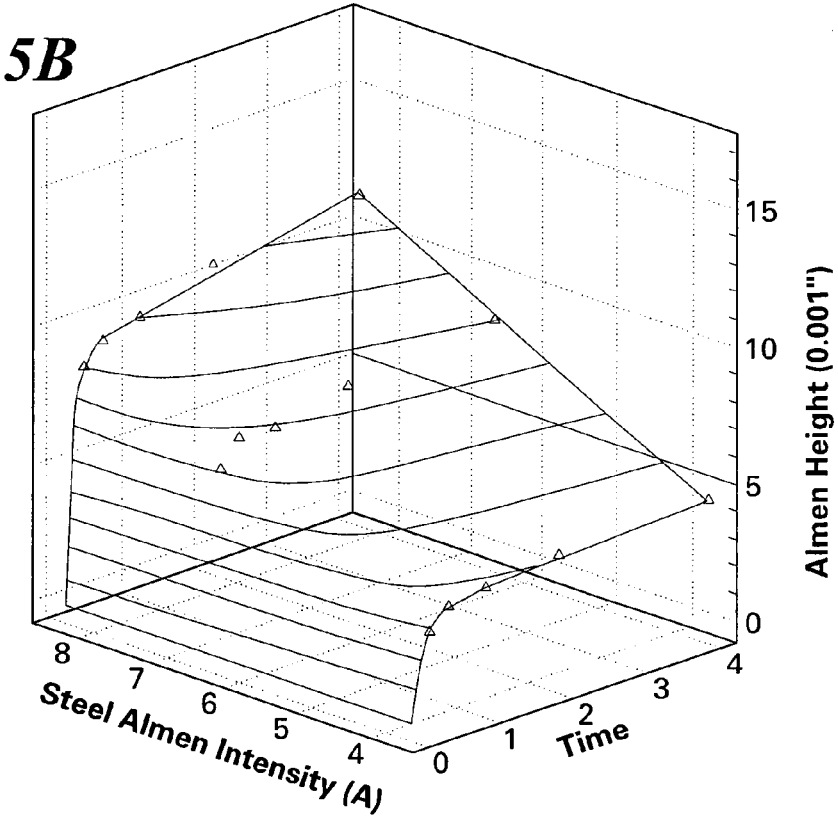

The response of test coupon 50 to peening varies with peen intensity I and peen coverage. Accordingly, for a particular embodiment, a peening arc height function $f_1^t$ is obtained by determining the response of test coupons to peening, for a number of peen intensity I values and peen coverage values. Although it is sought to determine the response to peening of a target material coupon (also indicated by reference numeral 50, and as indicated by reference superscript t in $f_1^t$), peening specifications, such as the peen intensity I, are measured and reported in terms of the industry standard steel coupons. Accordingly, for a more particular embodiment, the response to peening is determined for target material coupons 50 and for standard coupons 50, such as industry standard steel Almen coupons 50. Exemplary target coupons 50 are standard-sized target material coupons. Exemplary coupon arc height data is plotted in FIGS. 5a and 5b for steel and Inconel 718 test coupons 50, as a function of peen time and steel coupon peen intensity $I^s$. The data in FIGS. 5a and 5b are normalized with peen time instead of peen coverage because the coverage rates for the two materials are in general different. Desirably, by determining the response to peening of both target material coupons 50 and industry standard coupons 50 under substantially similar environmental conditions, the peen intensity I of the target material coupon 50 can be normalized to that of the industry standard steel Almen coupon 50.

According to another embodiment, the response of test coupon 50 to peening is empirically determined by peening target material and standard coupons 50 under a wide range of peen conditions. For this embodiment, the method further includes determining an empirical response of target material coupon 50 for a number of peen intensity values and peen coverage values, determining an empirical response of industry standard coupon 50 for the peen intensity values and peen coverage values, and normalizing the empirical response for target material coupon 50 using the empirical response for industry standard coupon 50 to obtain peening arc height function $f_1^t$ as a function of an industry-standard coupon peen coverage and an industry-standard coupon peen intensity $I^s$. For example, data can be generated by peening industry-standard steel and standard-sized target material coupons 50 under the same conditions for various time (or coverage) intervals. Each test coupon 50 will see virtually the same environment, but will generally respond differently to peening based on each material's unique properties. Constant peen intensity data can be generated by peening coupons 50 under the same conditions for various time (or coverage) intervals. Tests are repeated with different peen parameters to obtain data at different intensities I. An exemplary empirical response for target material coupon 50 is determined by fitting arc height (or deflection) data for the target material coupon 50. Similarly, an exemplary empirical response for industry standard Almen coupon 50 is determined by fitting arc height data for the industry standard steel coupon 50. An exemplary functional form for the empirical response to peening at a constant intensity I is:

$$h^t = (c_0 + c_1 \cdot t) \cdot (1 - \exp(-c_2 \cdot t)),$$

where $h^t$ is the response (or arc height), superscript t indicates the target material, and variable t is the peen time. Constants $c_0$, $c_1$, and $c_2$ are the $f_1^t$ parameters, which ultimately depend on machine and shot parameters. Machine parameters include air pressure, table rotational speed, and nozzle translation speed among others. Shot parameters include shot size and condition. A general functional form of the response of test coupon 50 to peening is:

$$h^t = f_0^t(C^s(t), [\text{machine parameters}], [\text{shot properties}]),$$

where $C^s(t)$ is peen coverage, which is a function of peen time. The superscript s denotes that coverage is determined for steel coupons 50, as the response of test coupon 50 to peening is both material and geometry dependent.

As noted above, FIG. 4 displays exemplary responses to peening of Iconel 718 and steel coupons 50 that were tested side-by-side. The arc height test data presented in FIG. 4 were obtained by testing four coupons 50 (one steel and three Iconel 718 coupons). The coupons 50 were placed at four positions on a rotating disk (not shown) inside a peening chamber (not shown). The radial distance between the four coupons 50 and the center of the disk was the same, to provide similar peening conditions for the four coupons 50. A spray nozzle spraying peen shots passed in a radial direction at a constant relative velocity over the coupons 50. In FIG. 4, the abscissa is in units of time, as opposed to coverage, because coverage evolves at different rates for steel and Iconel 718. However, t=1 corresponds to one hundred percent (100%) coverage on the steel coupon 50. Saturation points for the steel and the Iconel 718 coupons 50 are also identified on FIG. 4. The peen intensity I is the arc height at saturation. The intensity of the peening environment that all the coupons were subjected to is the arc height at saturation for the steel coupon curve, which is shown in FIG. 4 as $I^s=10.48$ mil.

Because peening specifications, such as the peen intensity I are measured and reported in terms of the industry standard Almen steel coupon response, the empirical response of the target material coupon 50 to peening is preferably normalized using the empirical response of the industry standard Almen steel coupon 50 to peening, to provide peening arc height function $f_1^t$, having a functional form:

$$h_m^t = f_1^t(C^s(t), I^s(\text{machine parameters}), \{\text{shot properties}\}).$$

It should be noted that although the test data presented in FIG. 5b were obtained for Inconel 718 coupons 50, coupon arc height data can be obtained for coupons 50 comprising many target materials. Moreover, one advantage of the peening arc height function $f_1^t$ is that it can be determined for many target materials. Consequently, the method can be applied, not only to generalized object geometries, but also for generalized object materials.

Linking Emperical and Model Coupon Response

Industrial peening requirements include a specification of a peen intensity I and a peen coverage. Accordingly, it is desirable to express the pseudo-peening parameters, surface layer thickness 40 and thermal load ΔT, as functions of peen intensity I and coverage. Thus, for a particular embodiment, the method further includes specifying a peen intensity I and a peen coverage, evaluating peening arc height function $f_1^t$ at the peen intensity I and the peen coverage to determine the peened arc height $h^t$, and specifying a surface layer thickness 40, and evaluating thermal function $F_2^t$ at the peened arc height $h^t$ to determine the thermal load ΔT. More particularly, peen intensity I is specified for industry standard test coupons 50, such as Almen steel test coupons. In this manner, the pseudo-peening parameters (which are the thermal load ΔT and surface layer thickness 40) represent the specified values of the peen intensity $I^s$ and peen coverage.

In order to express coupon arc height function $f_2^t$ as a function of peen intensity I, the method according to a particular embodiment further includes defining surface layer thickness 40 as a function $f_3(I)$ of peen intensity I For example, surface layer thickness 40 can be defined to be a fraction of the peen intensity I, or more particularly, a fraction of the steel peen intensity $I^s$. The specific fraction will depend on the intensity of the shot spray and the target material. For example, surface layer thickness 40 is set to ⅔ of the steel peen intensity $I^s$ for an N-type coupon (or $f_3(I^s)=⅔ I^s$) and ⅓ of the steel peen intensity $I^s$ for an A-type coupon 50, formed of Inconel 718 (or $f_3(I^s)=⅔ I^s$). These exemplary surface layer thickness 40 values were selected to be approximately twice the thickness of the material undergoing plastic deformation due to peening. However, this approximation is best for objects 1 that are not too thin. At very thin sections, i.e., where the surface layer thickness 40 approaches that of object 1, object stiffness can be altered unreasonably.

Beneficially, by determining peening arc height function $f_1^t$ experimentally, the pseudo-peening parameters are calibrated to experimental values, facilitating accurate pseudo-peening via thermal expansion of surface elements 22.

Modeling Generalized Geometries

Beneficially, the peening arc height function $f_1^t$ in combination with the thermal function $F_2^t$ and a rule for determining surface layer thickness 40 provides a solution of general applicability over a wide range of geometries. If instead, one were to solve the complex peening interactions analytically, without application of a pseudo-peening model, only simple geometries could be modeled.

Figure 7:
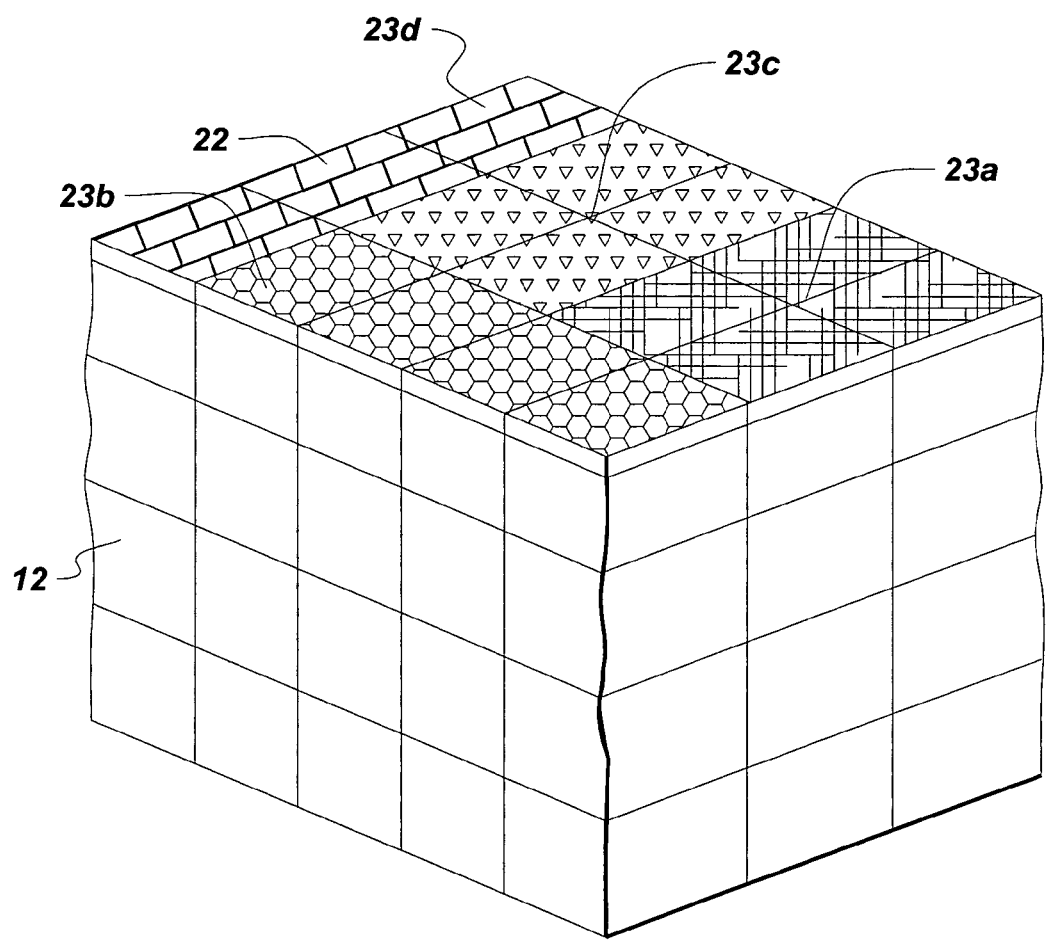
FIG. 7 shows an exemplary distribution of patches on the surface layer.
Figure 8:
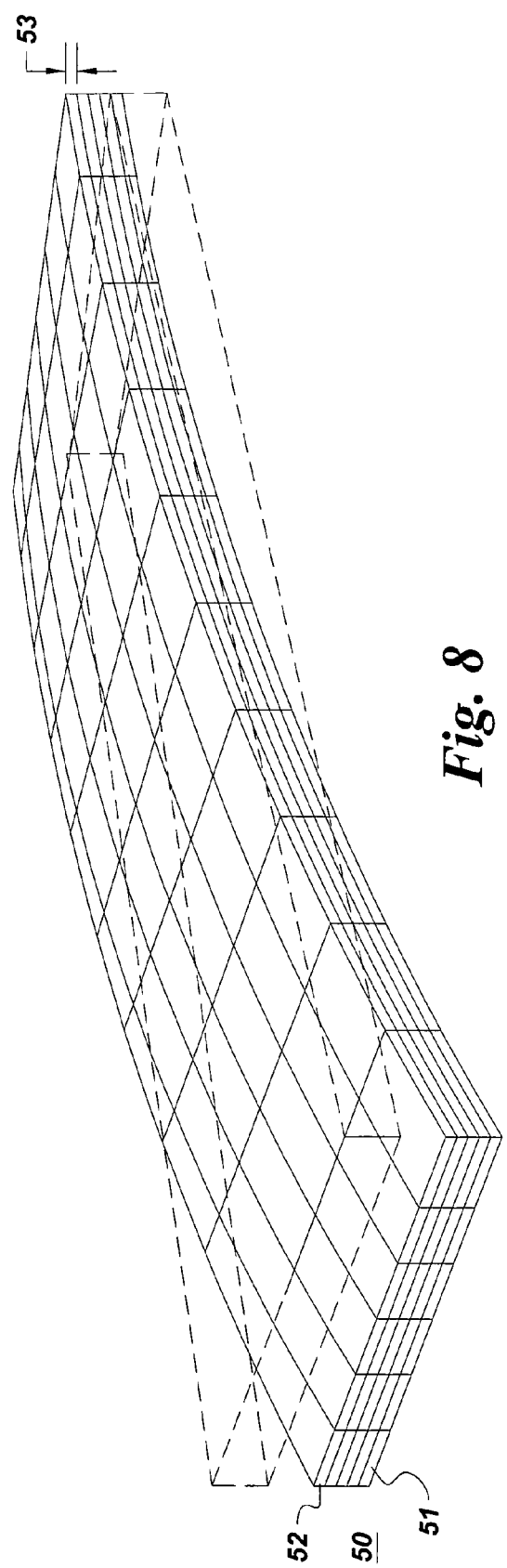
FIG. 8 shows an exemplary test coupon represented as a number of discrete solid and surface elements, the test coupon having a peened surface that is simulated as a number of test coupon surface elements overlying the solid elements.

For generalized object geometries having curved peening surfaces, peening intensity and coverage will vary over the peening surface. Thus, it is desirable for the method to account for such non-uniform peening of object 1. According to a specific embodiment, the method further includes specifying a number of patches 23 on surface layer 20. A purely illustrative distribution of patches $23_a–23_d$ is shown in FIG. 7, with the patches distinguished by different shading. The peening surface represented by patches 23 is generally subjected to a distribution of peening intensities $I_a^s–I_d^s$ and coverages $C_a^s(t)–C_d^s(t)$. For this embodiment, the portion of surface layer 20 within each patch $23_i$ is expanded in response to a thermal load $\Delta T_i$ for the respective patch $23_i$. For example, each of the patches $23_a–23_d$ would be expanded by application of a respective thermal load $\Delta T_a–\Delta T_d$. More particularly, the portion of surface layer 20 within patch $23_i$ is expanded in proportion to expansion coefficient a and thermal load $\Delta T_i$. In this manner, non-uniform peening of objects 1 with curved geometries, and hence curved peening surfaces, is simulated by applying different values of the pseudo-peening parameter ΔT, at the different patches 23 of surface layer 20, as illustrated in FIG. 7. According to the particular embodiment discussed above, where surface layer 20 comprises surface elements 22 and solid body 10 comprises solid elements 12, each of the patches 23 includes at least one surface elements 22, as indicated in FIG. 7. For this particular embodiment, the surface elements 22 within each patch 23 are expanded in response to the respective thermal load ΔT and, more particularly, in proportion to expansion coefficient a and the respective thermal load ΔT.

To determine the thermal load $\Delta T_i$ or each patch $23_i$, the method according to a more particular embodiment further includes specifying the peen intensity and the peen coverage for each of the patches 23, repeating the evaluation of the peening arc height function $f_1^t$ for each of the patches 23, and repeating the evaluation of thermal function $F_2^t$ for each of the patches 23. More particularly, surface layer thickness 40 is determined as a function $f_3(I^s)$ of peening intensity $I^s$ for each of the patches 23, based on the target material and on the type of coupon. In this manner, the thermal load $\Delta T_i$ for each patch $23_i$ is determined as a function of the peen intensity and peen coverage for that patch $23_i$.

Compensation for Distortion Due to Peening

Determination of the equilibrium configuration for object 1 identifies the effect of peening on object 1. It is desirable to use these results to compensate for the effect of peening without resort to additional manufacturing operations. Accordingly, a compensation method for peening-induced distortion of object 1 determines the equilibrium configuration of object 1 after peening, as discussed above, and adjusts at least one dimension of object 1 based on the equilibrium configuration. Exemplary dimensions include lengths, widths, heights, diameters, etc. and vary with object geometry. For example, if object 1 includes a feature with dimension $D_1$, which increased by $\Delta x_1$ in the post-peen equilibrium configuration, the dimension $D_1$ is reduced by the amount $\delta_1$ ($\delta_1=\Delta x_1$ can be taken as an initial value in the iterative process), where $\delta_1$ compensates for the additional peening-induced distortion to dimension $D_1$. According to a more particular embodiment, after the dimension(s) of object 1 are adjusted, the expansion of surface layer 20 and balancing of the forces on surface layer 20 and solid body 10 are repeated. In this manner, a new equilibrium configuration is determined for object 1 with revised dimensions. If the equilibrium configuration does not satisfy the desired shape and dimension specifications for object 1, the adjustment, expansion, and balancing steps are repeated, according to a particular embodiment. Beneficially, the inventive method determines the effect of peening on object 1 and adjusts the dimension(s) of object 1 to compensate for the peening-induced distortion, to provide an object 1 having a desired shape and dimensions.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method for determining an equilibrium configuration for an object to be subjected to peening, said method comprising:
   representing a bulk geometry of the object as a solid body;
   representing a surface of the object as a surface layer overlying the solid body;
   expanding the surface layer in response to a plurality of thermal loads to simulate peening; and
   balancing a plurality of forces on the surface layer and the solid body to determine the equilibrium configuration of the object after peening.

2. The method of claim 1, wherein the surface layer comprises a plurality of surface elements, wherein the solid body comprises a plurality of solid elements, wherein said expansion comprises expanding each of the surface elements in response to a respective one of the thermal loads, and wherein said balancing step comprises balancing the forces on the surface elements and the solid elements to determine the equilibrium configuration of the object after peening.

3. The method of claim 2, further comprising:
   specifying a plurality of patches on the surface layer, each patch including at least one surface element,
   wherein said expansion includes expanding the surface elements within each patch in response to a thermal load for the respective patch.

4. The method of claim 2, wherein said balancing of the forces includes constraining a displacement field to be continuous across an interface between the surface elements and the solid elements.

5. The method of claim 4, wherein said balancing of the forces includes using finite element analysis.

6. The method of claim 5, further comprising superimposing a plurality of residual stresses on the solid body within a finite element model, wherein said superposition is performed prior to said balancing of the forces.

7. The method of claim 1, further comprising:
   modeling a response of a test coupon to peening is a function of a surface layer thickness and the thermal load to obtain a coupon arc height function $f_2^c$; and
   interpolating the coupon arc height function $f_2^t$ to obtain a thermal function $F_2^t$ as a function of the surface layer thickness and a coupon arc height $h_m^t$.

8. The method of claim 7, wherein the response of the test coupon to peening is modeled as a function of the surface layer thickness and the thermal load using finite element analysis.

9. The method of claim 7, further comprising:
   determining an empirical response of a target material coupon for a plurality of peen intensity values and peen coverage values;
   determining an empirical response of an industry standard coupon for the peen intensity values and peen coverage values; and
   normalizing the empirical response of the target material coupon using the empirical response of the industry standard coupon to obtain a peening arc height function $f_1^t$ as a function of an industry standard peen coverage and an industry standard peen intensity.

10. The method of claim 9, wherein said determination of the respective empirical responses of the target material and the industry standard coupons includes:
    peening the target material coupon and the industry standard coupon to obtain a plurality of target material peening data and industry standard peening data, respectively; and
    fitting the target material peening data and the industry standard data, to obtain the respective empirical responses of the target material and industry standard coupons.

11. The method of claim 9, further comprising:
    specifying a peen intensity and a peen coverage;
    evaluating the peening arc height function $f_1^t$ at the peen intensity and the peen coverage to determine the peened arc height $h^1$; and
    evaluating the thermal function $F_2^t$ at the peened arc height $h^t$ to determine the thermal load.

12. The method of claim 11, wherein said specification of the peen intensity comprises specifying a steel peen intensity $I^s$.

13. The method of claim 11, further comprising defining the surface layer thickness as a function $f_3(I^s)$ of an industry standard peen intensity $I^s$.

14. The method of claim 13, wherein the surface layer thickness is defined to be equal to a fraction of the industry standard peen intensity $I^s$.

15. The method of claim 11, further comprising:
    specifying a plurality of patches on the surface layer,
    wherein said expansion includes expanding a portion of the surface layer within each patch in response to a thermal load for the respective patch.

16. The method of claim 15, wherein said specification of the peen intensity and the peen coverage is repeated for each of the patches, wherein said evaluation of the peening arc height function $f_1^t$ is repeated for each of the patches, and wherein said evaluation of the thermal function $F_2^t$ is repeated for each of the patches to determine the thermal load for each of the patches as a function of the respective peen intensity and peen coverage.

17. The method of claim 15, further comprising defining the surface layer thickness for each of the patches as a function of an industry standard peen intensity, wherein said expansion includes expanding the portion of the surface layer within each patch in response to the thermal load and in proportion to an expansion coefficient.

18. The method of claim 1, wherein said expansion includes expanding the surface layer in proportion to an expansion coefficient and the thermal loads.

19. A method for determining an equilibrium configuration for an object to be subjected to peening, said method comprising:
    representing a bulk geometry of the object as a plurality of solid elements;
    representing a surface of the object as a plurality of surface elements overlying the solid elements;
    specifying a plurality of patches on the surface of the object, each patch including at least one surface element, expanding the surface elements within each patch in response to a respective one of a plurality of thermal loads to simulate peening; and balancing a plurality of forces on the surface elements and the solid elements to determine the equilibrium configuration of the object after peening.

20. The method of claim 19, further comprising:

peening a target material coupon and an industry standard coupon to obtain a plurality of target material peening data and industry standard peening data, respectively;

fitting the target material peening data to obtain an empirical response of the target material coupon;

fitting the industry standard data to obtain an empirical response of the industry standard coupon; and normalizing the empirical response of the target material coupon using the empirical response of the industry standard coupon to obtain a peening arc height function $f_1^t$ as a function of an industry standard peen coverage and an industry standard peen intensity.

21. The method of claim 20, further comprising:

specifying a peen intensity and a peen coverage for each of the patches;

evaluating the peening arc height function $f_1^t$ at the peen intensity and the peen coverage to determine a peened arc height $h^t$, said evaluation being repeated for each of the patches;

modeling a response of a test coupon to peening as a function of a surface layer thickness and the thermal load to obtain a coupon arc height function $f_2^t$;

interpolating the coupon arc height function $f_2^t$ to obtain a thermal function $F_2^t$ as a function of the surface layer thickness and a model peened arc height $h_m^t$; and evaluating the thermal function $F_2^t$ at the peened arc height $h^t$ to determine the thermal load, said evaluation being repeated for each of the patches to determine the thermal load for each patch.

22. The method of claim 21, further comprising defining the surface layer thickness as a function $f_3(I^s)$ of an industry standard peen intensity $I^s$, wherein the response of the test coupon to peening is modeled using finite element analysis.

23. A compensation method for peening-induced distortion of an object to be subjected to peening, said method comprising:

representing a bulk geometry of the object as a solid body;

representing a surface of the object as a surface layer overlying the solid body;

specifying a plurality of patches on the surface layer of the object;

expanding a portion of the surface layer within each patch in response to a respective one of a plurality of thermal loads to simulate peening;

balancing a plurality of forces on the surface layer and the solid body to determine an equilibrium configuration of the object after peening; and adjusting at least one dimension of the object based on the equilibrium configuration determined by said balancing step.

24. The method of claim 23, wherein said expansion, balancing, and adjustment are repeated at least once.

25. The method of claim 23, further comprising:

peening a target material coupon and an industry standard coupon to obtain a plurality of target material peening data and industry standard peening data, respectively;

fitting the target material peening data to obtain an empirical response of the target material coupon;

fitting the industry standard data to obtain an empirical response of the industry standard coupon; and normalizing the empirical response of the target material coupon using the empirical response of the industry standard coupon to obtain a peening arc height function $f_1^t$ as a function of an industry standard peen coverage and an industry standard peen intensity.

26. The method of claim 25, further comprising:

specifying a peen intensity and a peen coverage for each of the patches;

evaluating the peening arc height function $f_1^t$ at the peen intensity and the peen coverage to determine the peened arc height $h^t$, said evaluation being repeated for each of the patches;

modeling a response of a test coupon to peening as a function of a surface layer thickness and the thermal load to obtain a coupon arc height function $f_2^t$;

interpolating the coupon arc height function $f_2^t$ to obtain a thermal function $F_2^t$ as a function of the surface layer thickness and a model arc height $h_m^t$; and evaluating the thermal function $F_2^t$ at the peened arc height $h^t$ to determine the thermal load, said evaluation being repeated for each of the patches to determine the thermal load for each patch.

27. The method of claim 26, further comprising defining the surface layer thickness as a function $f_3(I^s)$ of an industry standard peen intensity $I^s$, wherein the response of the test coupon to peening is modeled using finite element analysis.

28. The method of claim 23, wherein the surface layer comprises a plurality of surface elements, wherein the solid body comprises a plurality of solid elements, wherein said expansion comprises expanding the surface elements within each patch in response to the respective thermal load, and wherein said balancing step comprises balancing the forces on the surface elements and the solid elements to determine the equilibrium configuration of the object after peening.

* * * * *